United States Patent [19]

Hadden

[11] Patent Number: 4,463,800

[45] Date of Patent: Aug. 7, 1984

[54] RADIATOR MOUNTED CONDITION SENSING PROBE

[76] Inventor: Clifford F. Hadden, Fontana, Calif.

[21] Appl. No.: 423,857

[22] Filed: Sep. 27, 1982

[51] Int. Cl.³ .......................... F28F 7/00; G01K 1/14; F02B 77/00

[52] U.S. Cl. ................................... 165/11 R; 165/76; 123/41.15; 374/208

[58] Field of Search ............... 165/11 R, 76, 152, 153; 123/41.15; 374/35, 120, 145, 146, 158, 208

[56] References Cited

U.S. PATENT DOCUMENTS

| | | | |
|---|---|---|---|
| 1,233,385 | 7/1917 | Maurer | 374/208 |
| 1,507,449 | 9/1924 | Anchelevich | 165/76 |
| 2,270,211 | 1/1942 | Bruns | 374/208 |
| 3,779,079 | 12/1973 | Snook | 374/208 |
| 3,938,587 | 2/1976 | Vian | 165/76 |

FOREIGN PATENT DOCUMENTS

| | | | |
|---|---|---|---|
| 2300236 | 7/1974 | Fed. Rep. of Germany | 374/208 |
| 2300309 | 7/1974 | Fed. Rep. of Germany | 374/208 |
| 3005075 | 8/1981 | Fed. Rep. of Germany | 165/11 R |
| 1473476 | 2/1967 | France | 165/11 R |
| 1008513 | 10/1965 | United Kingdom | 165/11 |
| 2045433 | 10/1980 | United Kingdom | 374/208 |

Primary Examiner—William R. Cline
Assistant Examiner—Edward P. Walker

[57] ABSTRACT

Apparatus for installing a condition-sensing element or the like in a heat exchanger, such as a radiator, comprising an elongated probe containing the sensing element, and a device securing the probe in a space defined between two adjacent cooling fins in the heat exchanger. The latter device comprises an elongate member dimensioned for insertion through one of the interfin spaces, and a pair of retention elements attached to either end of the elongate member. The retention elements have apertures for receiving the probe when the probe is inserted through an inter-fin space proximate the space through which the elongate member is inserted. The retention elements are lockable into a position of engagement with either side of the heat exchanger, and, when so locked in position, capture the probe so as to retain it in place. The retention elements are dimensioned to block the flow of air through the inter-fin spaces adjacent to the probe.

5 Claims, 4 Drawing Figures

U.S. Patent  Aug. 7, 1984  4,463,800
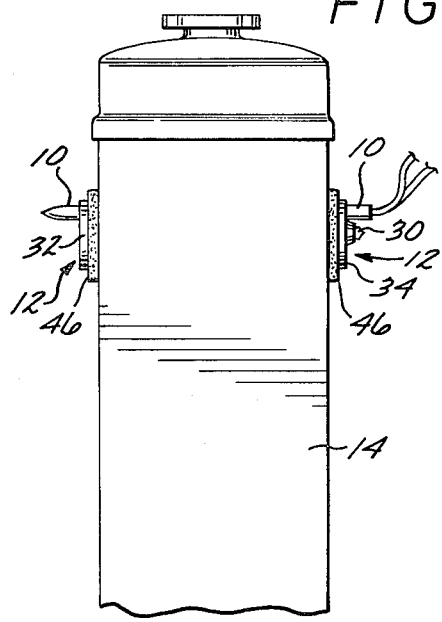
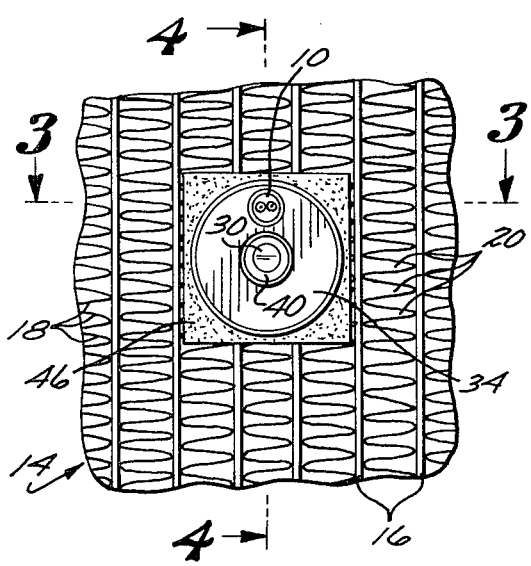
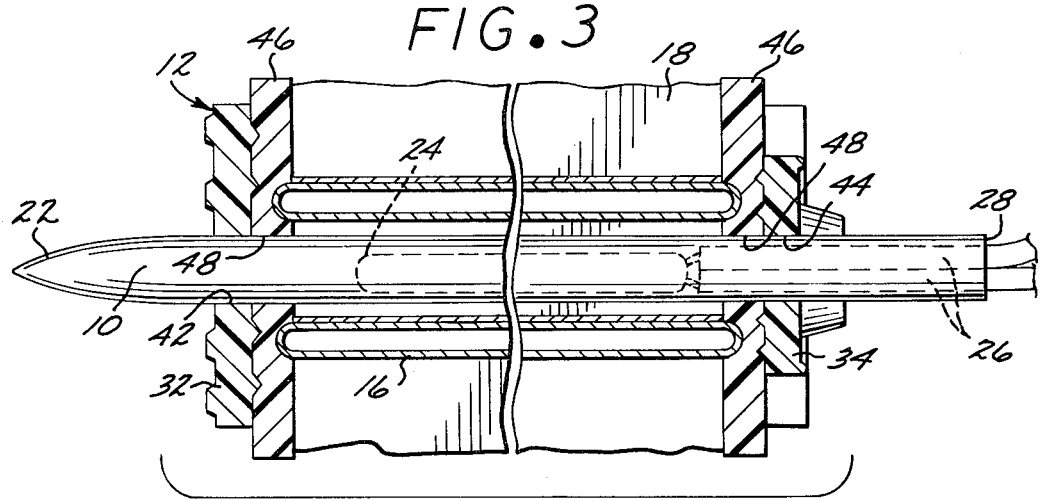
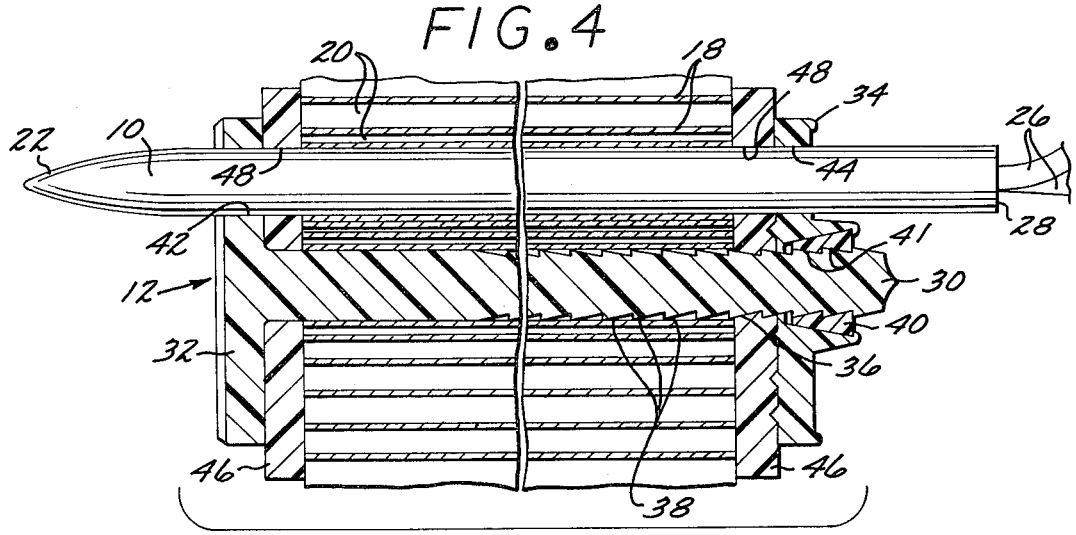

RADIATOR MOUNTED CONDITION SENSING PROBE

The present invention relates to a device for mounting a sensing probe between the cooling fins of a heat exchanger. More particularly, the invention relates to novel apparatus for holding a sensor between the cooling fins of a heat exchanger such as a radiator, air conditioning condensor, or oil cooler, of the type adapted for use in an engine.

Various types of heat exchangers are employed in connection with internal combustion engines, such as are used in motor vehicles. Besides the radiator, such heat exchangers include air conditioner condensors and oil coolers for transmission fluid and engine lubricating oil. In a variety of applications, it is necessary or desirable to sense the temperature of the liquid coolant flowing through such a heat exchanger, or to sense another condition related to the motor vehicle. For example, it might be desirable to have an electrically operated cooling fan which is actuated when the coolant temperature in the heat exchanger or some other variable reaches a predetermined value.

In the past, coolant temperature has been sensed by placing a probe within a hose which delivers the coolant to or from the heat exchanger. This method is inconvenient, in that during installation the hose must first be disconnected, resulting in the possible loss of coolant, which then must be replaced. Accordingly, it has been commonly recognized that some means for attaching the sensing probe externally to the heat exchanger would be preferable. In order for an externally mounted probe to function properly, it must be mounted so as to be in good thermal contact with the coolant in order to sense the coolant temperature accurately. In the past, it has been contemplated to mount an external temperature sensing probe directly onto the exterior surface of the radiator tank by means of a bonding agent or by mechanical attachment means. However, these methods suffer, to varying degrees, the drawbacks of inconvenience of installation, poor thermal contact with the coolant, and lack of durability over extended periods of time. Accordingly, it would be desirable to provide some means for mounting a temperature sensing probe onto a radiator or like heat exchanger, wherein good thermal contact with the coolant is maintained, and which also allows for quick and simple installation. Such a mounting means should also be durable in the sense of not being prone to loosening as a result of shocks, jolts, or vibrations as would be experienced in the engine compartment of a motor vehicle.

According to the present invention, there is provided a thin, substantially cylindrical probe for a temperature-sensitive element, such as a thermocouple, bi-metallic strip or a thermistor. The probe is dimensioned so as to fit between the cooling fins and tubes of a heat exchanger, particularly a radiator, with the external surface of the probe bearing against the surfaces of the adjacent fins and/or tubes. There is also provided apparatus for securely mounting the probe in this position and locking it in place so that it cannot be jarred loose by vibrations, shocks, jolts, and the like.

The mounting apparatus is, basically, a modified form of the oil cooler fastening device disclosed in U.S. Pat. No. 3,938,587—Vian (assigned to the same assignee as the present invention), the disclosure of which is incorporated herein by reference. Broadly, the device disclosed in the Vian patent (hereinafter referred to as the "Vian device") comprises a thin, elongate member dimensioned to extend through the spaces between the cooling fins of a heat exchanger, such as a radiator. The elongate member carries a pair of retention elements, termed "abutment members", adapted to be secured at spaced positions along the length of the elongate member on opposite sides of the heat exchanger. At least one of the abutment members is longitudinally moveable on the elongate member toward the other abutment member into a tensioning position wherein the elongate member is placed under tension between the abutment members. The moveable abutment member is lockable with the elongate member to maintain the aforementioned components in the tensioning position.

In accordance with the present invention, the "Vian device" has been specifically modified to adapt said device to mounting the above-mentioned cylindrical temperature sensing probe. Each of the abutment members is provided with an aperture which may be dimensioned snugly to receive the probe. The apertures in the two abutment members are aligned with each other, and are spaced from the elongate tensioning member so that when the elongate member is inserted through a selected space between two cooling fins, the apertures are aligned with the same space or a nearby space between two other cooling fins. Against the inwardly-facing surface of each of the abutment members is a self-adhesive resilient compression pad, of the type disclosed in the aforementioned Vian patent. The pads have apertures which are dimensioned similarly to the abutment member apertures and are aligned therewith. Each of the abutment members, along with its associated pad, forms what may be termed a "retention element".

In operation, the fastener is attached to the radiator or like heat exchanger by the insertion of the elongate member through one of the inter-fin spaces, with the moveable retention element installed, but not locked, onto the free end of the elongate member. The aforementioned apertures can then be aligned with another inter-fin space or the same space, if desired, and the probe inserted through the apertures and the selected space. When the moveable retention element is locked onto the elongate member so as to compress the pads and put the elongate member under tension, pressure is applied to the probe to lock it securely in place. It will be appreciated that the abutment members, with their associated compression pads, and the locking means, provide the dual function of locating and aligning the probe with a selected inter-fin space, while securing the probe firmly within said space. The compression pads may be the same size as the abutment members, or they may be advantageously dimensioned somewhat larger than the abutment members. The pads and abutment members cooperate to block the flow of air through inter-fin spaces adjacent to the space in which the probe is located, as well as very effectively sealing the space in which the probe is situated from the ambient atmosphere. This structure minimizes the heat loss between the probe and the ambient air, thereby enhancing the accuracy of the temperature measurements.

As will be more clearly understood from the detailed description which follows, the present invention overcomes the previously discussed shortcomings of the prior art by providing a temperature sensing probe and associated mounting assembly which allows a secure and durable installation of the probe in intimate thermal contact with the coolant-carrying parts of the heat exchanger, and which is easily and quickly installed with no risk of coolant loss. Moreover, the structure of the invention allows the probe to be installed in a manner which maximizes the accuracy and reliability of the temperature measurements which are taken by the temperature sensitive element. Finally, the structure of the invention allows for ease and economy of manufacture.

FIG. 1 is a side elevational view of a radiator for an internal combustion engine in which a probe and mounting apparatus, in accordance with the present invention, have been installed;

FIG. 2 is an enlarged, fragmentary view of the radiator of FIG. 1, as seen from the right side of said figure, showing details of the present invention as installed in said radiator;

FIG. 3 is a cross-sectional view taken along line 3—3 of FIG. 2; and

FIG. 4 is a cross-sectional view taken along line 4—4 of FIG. 2.

Referring to the drawings, a temperature probe 10 and mounting apparatus 12 for said probe, in accordance with the present invention, are shown installed in a radiator 14, of the type commonly employed in internal combustion engines. Although the description which follows describes the invention in conjunction with a radiator, it will be understood that the invention can be employed in any type of coolant-filled heat exchanger of analogous construction. In fact, it is contemplated within the purview of this invention that such probe 10 could be made to sense any of a number of conditions which may or may not be related to temperature. As best shown in FIG. 2, the radiator 14 is of a common type having tubes 16 which carry a liquid coolant. Extending between adjacent tubes 16 are cooling fins 18 which terminate at the opposite sides of the radiator 14 to provide through openings thereat.

As best shown in FIG. 3, the probe 10 comprises a substantially tubular or cylindrical body of a thermally-conductive material with a hollow interior and may be provided with a pointed or tapered tip 22. The interior of the probe 10 contains a temperature sensitive element 24, as shown in phantom in FIG. 3. The temperature sensitive element 24 may be of any conventional type, such as a thermocouple, bi-metallic strip or a thermistor, and is connected to associated circuitry (not shown) by wires 26 extending out of an open end 28 of the probe 10 opposite the tapered end 22.

The body of the probe 10 is dimensioned so that it is snugly received within one of the spaces 20, the tapered tip 22 facilitating insertion therein. When so inserted, the exterior surface of the probe will be in intimate contact with the surfaces of the adjacent tubes 16 or fins 18 defining the space 20 into which the probe 10 has been inserted. The outside diameter of the probe 10 may advantageously be made slightly larger than the width of the selected space 20 so as to compress slightly the adjacent tubes 16 or fins 18, as shown in FIG. 4. The resultant compressive force provides a secure retention of the probe 10 in the space 20, while also ensuring that an intimate thermal contact between the probe 10 and the adjacent fins 18 is maintained.

As best shown in FIGS. 3 and 4, the mounting device 12 for the probe 10 is essentially a modified form of the fastening device disclosed in the aforementioned Vian patent. Thus, its essential structure comprises an elongate tensioning member 30 having a flattened integral head at one end forming a fixed abutment member 32, and a moveable abutment member 34 engageable with the opposite end of the tension member 30. The length of the elongate member 30 should be sufficient so that both ends thereof extend somewhat beyond the sides of the heat exchanger 14, as shown in FIG. 4. Extending along a length of the elongate member 30 from the end thereof opposite the fixed abutment member 32 is a gripping surface 36 comprising a plurality of longitudinally aligned inclined cog members 38. The moveable abutment member 34 has a central aperture which accommodates the elongate member 30 and which also contains a locking element 40 having interior surfaces 41 which engage and mate with the inclined cog members 38 so as to lock the moveable abutment member 34 in a selected position along the length of the elongate member 30. While the locking mechanism, comprising the cog members 38 and locking element 40, differs in some details from the analogous mechanism disclosed in the aforementioned Vian patent, it should be appreciated that any of the locking mechanisms disclosed in said patent may be used in the present invention.

The fixed abutment member 32 is provided with an aperture 42 which is radially spaced from the elongate member 30 so that when the elongate member 30 is inserted into one of the spaces 20, the aperture 42 is aligned with the same or a different one of the spaces 20 through which the elongate member 30 has been inserted. The moveable abutment member 34 has a similar aperture 44 which is alignable with the aperture 42 in the fixed abutment member, so that the apertures 42 and 44, and the selected space 20 therebetween are all in alignment.

In contact with the inwardly-facing surfaces of the abutment members 32 and 34 are a pair of resilient compression pads, 46, of the type disclosed in the aforementioned Vian patent. Such pads may be of the self-adhesive type to be attached to the abutment members but need only be compressed when assembled and therefore the adhesive attachment is not necessary for successful practice of the present invention. Each of the pads 46 is provided with an aperture 48 which, when the pad is related to its associated abutment member, is aligned with the adjacent abutment member aperture. The apertures 42, 44 and 48 are dimensioned to receive and retain the probe 10 when the latter is inserted through these apertures and through the space 20 aligned therewith. Each of the abutment members 32 and 34, with its associated pad 46, may be termed a "retention element".

To mount the probe 10 in the radiator 14 or similar heat exchanger, the elongate tensioning member 30 is inserted through a selected one of the inter-fin spaces and pushed therethrough until the pad 46 at the fixed abutment member 32 abuts against the adjacent surface of the radiator. The moveable retention element (abutment member 34 and its pad 46) is then installed loosely on the protruding end of the elongate member 30 opposite the fixed retention element (abutment member 32 and its pad 46), so that the apertures 42, 44 and 48 are aligned with another inter-fin space 20. The probe 10 is then inserted through these apertures and the space 20 aligned therebetween. The moveable retention element is then urged toward the fixed retention element so as to compress the pads 46 against the sides of the radiator 14. When a suitable degree of compression is obtained, the moveable retention element is locked in place onto the elongate member 30 by means of the locking element 40. With the installation completed in this manner, the probe 10 is held firmly and securely within its associated inter-fin space, with good thermal contact being maintained between the probe and the adjacent tubes 16 or cooling fins 18. The pressure exerted on the probe 10 by the compression of the pads 46 thereagainst substantially restrains the probe 10 from longitudinal movement within the space 20, and provides resilient mounting of the probe so that it can withstand shocks, jolts and other vibrations. This compression of the pads against the probe also seals the space in which the probe is located from the flow of air, so that heat from the cooling fins and/or tubes is not lost to air flowing through the space 20 in which the probe is located. Moreover, the pads 46 may advantageously be made somewhat larger in width than the abutment members 32 and 34, as shown, so that air flow through the spaces surrounding the space in which the probe is located is also blocked. With air flow essentially excluded from the radiator area around the probe, heat loss from this area of the radiator to the ambient atmosphere is kept to a minimum, thereby enhancing the accuracy of the measurement of coolant temperature.

Thus, as described above, the present invention provides for the installation of a temperature sensing probe in a heat exchanger in a manner which allows for highly accurate temperature measurements. Moreover, the installation provided by the mounting apparatus of the present invention is both secure and durable, capable of withstanding shocks, jolts and vibrations without a significant degree of loosening. In addition, with the present invention, the sensing probe can be quickly and easily installed using apparatus which is relatively simple and inexpensive to manufacture, without disassembling or in any way degrading the structural integrity of any of the components of the heat exchanger system.

What is claimed is:

1. Apparatus for installing a condition sensing element in a heat exchanger of the type having a plurality of cooling fins extending between first and second opposite sides, and elongate spaces each extending from an opening in said first side to an opening in said second side between adjacent ones of said cooling fins, said apparatus comprising:

an elongate probe comprising said sensing element and having exterior dimensions substantially equal to a first one of said spaces so as to contact the cooling fins on either side of said space, said probe having first and second ends which protrude from said first and second sides, respectively, when so inserted;

a thin, elongate member dimensioned for insertion through a second one of said spaces, and having first and second ends which protrude from said first and second sides, respectively, when so inserted; and retention means for (a) connecting said first and second ends of said elongate member to said first and second ends, respectively, of said probe, and (b) retaining said probe and said elongate member in said spaces comprising first and second retention elements, each of which includes a rigid member having a surface facing said heat exchanger adapted for attachment to said first and second ends, respectively, of said elongate member, at least one of said retention elements being longitudinally moveable on said elongate member toward the other retention element so as to cause said first and second retention elements firmly to engage said first and second sides, respectively, of said heat exchanger; a resilient pad adhesively attached to each of said surfaces, respectively, and having area sufficient to cover the openings of a plurality of said spaces at least adjacent to said first one of said spaces; and locking means for locking said first and second retention elements in engagement with said first and second sides, respectively, of said heat exchanger.

2. Apparatus for installing a condition sensing element in a heat exchanger of the type having a plurality of cooling fins extending between first and second opposed sides, and elongate spaces each extending from an opening in said first side to an opening in said second side between adjacent ones of said cooling fins, said apparatus comprising:

an elongate probe comprising said sensing element and having exterior dimensions substantially equal to those of a first one of said spaces so as to contact the cooling fins on either side of said space, said probe having first and second ends which protrude from said first and second sides, respectively, when so inserted;

a thin, elongate member dimensioned for insertion into a second one of said spaces, and having first and second ends which protrude from said first and second sides, respectively, when so inserted;

a first retention element fixedly attached to said first end of said elongate member, and having an aperture which is alignable with said first one of said spaces and dimensioned to receive said first end of said probe;

a second retention element attached to said elongate member proximate said second end thereof so as to be longitudinally moveable thereon and having an aperture which is alignable with said first one of said spaces and dimensioned to receive said second end of said probe; and means for locking said second retention member in a selectable position on said elongate member.

3. The apparatus of claim 2, wherein said first and second retention elements each comprises:

a rigid member having a surface facing said heat exchanger; and a resilient member adjacent said surface.

4. The apparatus of claim 3, wherein each of said resilient members has an area sufficient to cover the openings of the spaces adjacent to said first one of said spaces when said first and second retention elements are positioned so as to engage said first and second sides, respectively, of said heat exchanger.

5. The apparatus of claim 2, wherein said probe is thermally-conductive, is substantially cylindrical, and has a diameter which is substantially equal to the width of said first one of said spaces, and wherein said first end of said probe is tapered.

* * * * *